US009543678B2

United States Patent
Shimizu

(10) Patent No.: US 9,543,678 B2
(45) Date of Patent: Jan. 10, 2017

(54) VEHICLE-SIDE CONNECTOR

(71) Applicant: Sumitomo Wiring Systems, Ltd., Yokkaichi, Mie (JP)

(72) Inventor: Tooru Shimizu, Mie (JP)

(73) Assignee: SUMITOMO WIRING SYSTEMS, LTD., Yokkaichi, Mie (JP)

(*) Notice: Subject to any disclaimer, the term of this patent is extended or adjusted under 35 U.S.C. 154(b) by 0 days.

(21) Appl. No.: 14/772,147

(22) PCT Filed: Mar. 19, 2013

(86) PCT No.: PCT/JP2013/057876
§ 371 (c)(1),
(2) Date: Sep. 2, 2015

(87) PCT Pub. No.: WO2014/147758
PCT Pub. Date: Sep. 25, 2014

(65) Prior Publication Data
US 2016/0006156 A1    Jan. 7, 2016

(51) Int. Cl.
*H01R 13/62* (2006.01)
*H01R 13/04* (2006.01)
(Continued)

(52) U.S. Cl.
CPC ............ *H01R 13/04* (2013.01); *B60L 11/1818* (2013.01); *H01R 4/72* (2013.01); *H01R 13/4367* (2013.01);
(Continued)

(58) Field of Classification Search
CPC ......... H01R 13/04; H01R 13/521; H01R 4/72; B60L 11/1818
(Continued)

(56) References Cited

U.S. PATENT DOCUMENTS 7,625,229 B2 * 12/2009 Cross ................ H01R 13/5202
439/468
8,075,329 B1 * 12/2011 Janarthanam ....... B60L 11/1818
439/304
(Continued)

FOREIGN PATENT DOCUMENTS

| JP | 7-42036 | 7/1995 |
|----|---------|--------|
| JP | 2006-196427 | 7/2006 |
| JP | 2011-249039 | 12/2011 |
| JP | 2012-84273 | 4/2012 |

OTHER PUBLICATIONS

International Search Report.

*Primary Examiner* — Abdullah Riyami
*Assistant Examiner* — Nader Alhawamdeh
(74) *Attorney, Agent, or Firm* — Gerald E. Hespos; Michael J. Porco; Matthew T. Hespos

(57) ABSTRACT

A vehicle-side connector (10) is connectable to a charging connector (1) for charging a battery in a vehicle and includes a housing (30) on the vehicle such that the charging connector (1) can fit therein from the front. Terminal fittings (11) connected respectively to wires (20P, 20S) are drawn out from the interior of the vehicle including the battery. Terminal accommodating chambers (40) are provided in the housing (30) and the respective terminal fittings (11) are inserted therein from behind. Each terminal fitting (11) is a round pin terminal (12) with a terminal connecting portion (13) on one end for connection to a charging terminal in the charging connector (1) and a wire connecting portion (14) on the other end to be crimped to an end of the wire (20P, 20S). The terminal connecting portion (13) is retained in the terminal accommodating chamber (40).

2 Claims, 15 Drawing Sheets

(51) Int. Cl.
*H01R 4/72* (2006.01)
*H01R 13/436* (2006.01)
*H01R 13/52* (2006.01)
*H01R 24/86* (2011.01)
*B60L 11/18* (2006.01)
*H01R 107/00* (2006.01)

(52) U.S. Cl.
CPC ............ *H01R 13/521* (2013.01); *H01R 24/86* (2013.01); *B60L 2240/36* (2013.01); *B60L 2270/32* (2013.01); *B60L 2270/34* (2013.01); *H01R 2107/00* (2013.01); *Y02T 10/7005* (2013.01); *Y02T 10/7072* (2013.01); *Y02T 90/14* (2013.01)

(58) Field of Classification Search
USPC ................................................ 439/468, 310
See application file for complete search history.

(56) References Cited

U.S. PATENT DOCUMENTS

| | | | |
|---|---|---|---|
| 8,206,171 B2* | 6/2012 | Osawa | H01R 13/502 439/352 |
| 2011/0223798 A1* | 9/2011 | Chartrand | H01R 4/2404 439/468 |
| 2011/0260684 A1* | 10/2011 | Xiaofeng | A61K 31/661 320/109 |
| 2011/0287667 A1* | 11/2011 | Ichio | H01R 13/4367 439/660 |
| 2016/0072213 A1* | 3/2016 | Ichio | B60L 11/1818 439/34 |
| 2016/0072224 A1* | 3/2016 | Ichio | B60L 11/1818 439/345 |

* cited by examiner

VEHICLE-SIDE CONNECTOR

BACKGROUND

1. Field of the Invention

The present invention relates to a vehicle-side connector to be connected to a charging connector during charging.

2. Description of the Related Art

Conventionally, an example of a vehicle-side connector of this type is known from Japanese Unexamined Patent Publication No. 2011-249039. This connector is structured such that a plurality of terminal accommodating chambers are aligned and formed in a housing to be mounted to face a power supply port open on a body and terminals, e.g. round pin terminals, connected to ends of wires drawn out from the side of a battery are inserted and accommodated into the corresponding terminal accommodating chambers from behind, and the battery is charged by connecting a charging connector connected to a power supply to this vehicle-side connector.

However, in recent years, an engine compartment has become overcrowded due to a higher capacity of a battery and the like particularly in plug-in hybrid vehicles, and a sufficient space for drawing out wires cannot be ensured on the rear surface of a vehicle-side connector in some cases. Thus, it is considered to realize space saving by bending the wires drawn out to the rear surface of the vehicle-side connector at a right angle. However, there is a limit due to a possibility of breakage or the like if the wires are bent at a large curvature (at a small radius of curvature) and it has been actually impossible to realize sufficient space saving.

The present invention was completed based on the above situation and aims to realize further space saving in wire routing on a rear surface side of a housing.

SUMMARY

The present invention is directed to a vehicle-side connector to be connected to a charging connector to charge a battery mounted in a vehicle, including a housing provided on the vehicle such that the charging connector is fittable thereto from front, terminal fittings respectively connected to a plurality of wires drawn out from the interior of the vehicle including the battery, and a plurality of terminal accommodating chambers provided in the housing and configured such that the respective terminal fittings are accommodated thereinto by being inserted from behind, wherein the terminal fitting is a round pin terminal formed by being bent to include a terminal connecting portion to be connected to a charging terminal provided in the charging connector on one end side and a wire connecting portion to be crimped to an end of the wire on the other end side, and the terminal connecting portion of the terminal fitting is retained and accommodated in the terminal accommodating chamber.

Since the terminal fittings are formed by being bent, the wires themselves can be arranged in a direction perpendicular to the terminal accommodating chambers without being bent, with the result that space saving on the rear surface of the housing can be realized. Further, since the terminal fittings are the round pin terminals and the wire connecting portions can be rotated about their axes in the terminal accommodating chambers, diversification in a draw-out direction in the case of radially drawing out the wires on the rear surface of the housing can be easily dealt with.

The following configurations may also be adopted.

(1) A seal ring to be held in close contact with an entrance of the terminal accommodating chamber is mounted on a base end side of the terminal connecting portion in the terminal fitting. The terminal accommodating chamber can be made waterproof from outside while the terminal fitting is allowed to rotate about an axis of the terminal accommodating portion.

(2) An insulating tube portion made of synthetic resin is provided on the outer periphery of a bent portion of the terminal fitting. Adjacent terminal fittings can be reliably insulated by the contact of the insulating tube portions such as when the terminal fittings are arranged in a concentrated manner.

(3) A locked groove is formed on a base end part of the terminal connecting portion in the terminal fitting, the terminal connecting portion of the terminal fitting is retained and accommodated in the terminal accommodating chamber by radially inserting a retainer into the locked groove of the terminal connecting portion, and one end surface of the insulating tube portion constitutes one groove surface of the locked groove. The groove surface of the locked groove can be formed into a flat surface and precise mounting of the retainer can be ensured.

According to the present invention, it is possible to realize further space saving in wire routing on a rear surface side of a housing.

DETAILED DESCRIPTION

One embodiment of the present invention is described based on FIGS. 1 to 17. In this embodiment, a vehicle-side connector 10 to be connected to a mating charging connector 1 to charge a battery mounted in a plug-in hybrid vehicle is illustrated.

Figure 1:
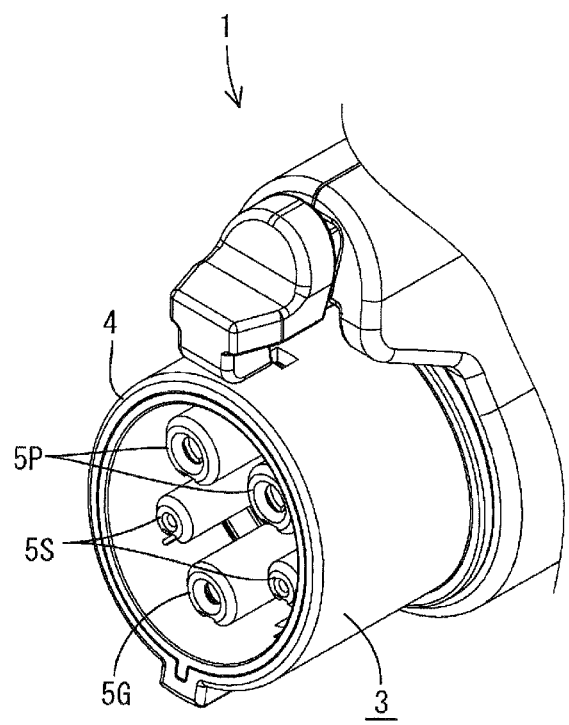
FIG. 1 is a perspective view of a mating charging connector according to one embodiment of the present invention.
Figure 2:
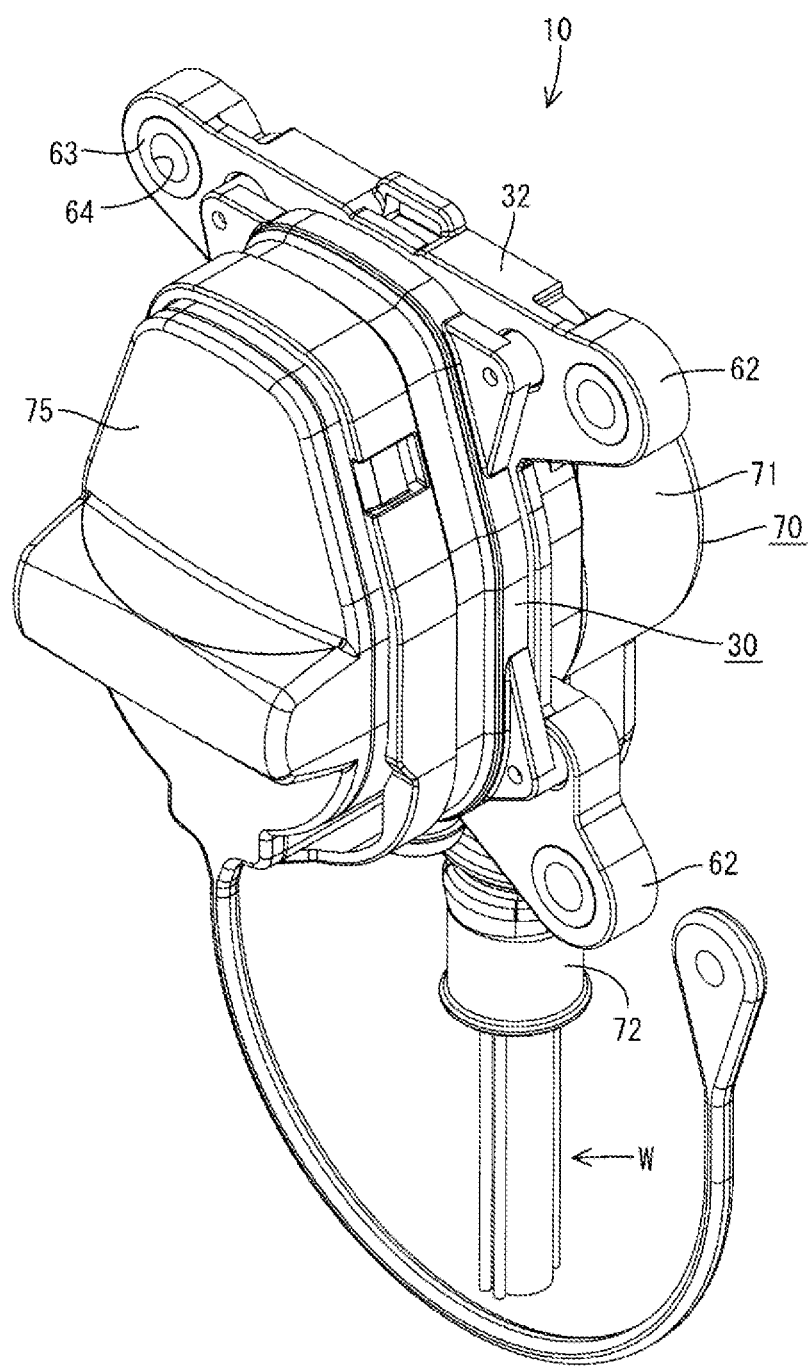
FIG. 2 is a perspective view of a vehicle-side connector.

First, the mating charging connector 1 is briefly described. As shown in FIG. 1, the charging connector 1 includes a female housing 3 to be connected to a male housing 30 of the vehicle-side connector 10. This female housing 3 is structured such that five terminal accommodating tubes 5 independent of each other project from a back wall in a small receptacle 4. Female power terminals are accommodated in two terminal accommodating tubes 5P in an upper row, a female ground terminal is accommodated in the terminal accommodating tube 5G in the center of a lower row and female signal terminals are accommodated in the terminal accommodating tubes 5S on opposite ends of the lower row.

As shown in FIGS. 2 to 5, the vehicle-side connector 10 includes five vehicle-side terminals 11, the male housing 30, a retainer 50, a grommet 70 and the like. This vehicle-side connector 10 is fixed to a body or the like of the vehicle to face a power supply port provided on the body, and the female housing 3 of the above charging connector 1 is connectable to the male housing 30 from front.

The vehicle-side terminals 11 are composed of two male power terminals 11P, one male ground terminal 11G and two male signal terminals 11S. In the following description, the five vehicle-side terminals are referred to as "vehicle-side terminals 11" when being commonly described while being distinguished as the power terminals 11P, the ground terminal 11G and the signal terminals 11S when being individually described.

Each vehicle-side terminal 11 is basically formed of an L-shaped round pin terminal 12.

Figure 6:
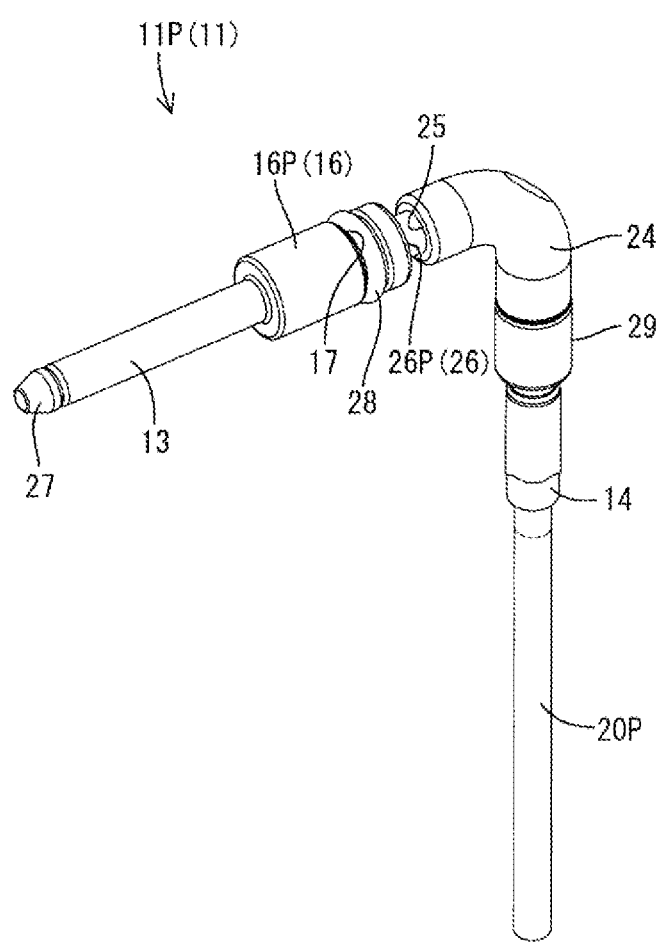
FIG. 6 is a perspective view of a vehicle-side power terminal connected to an end of a wire.
Figure 7:
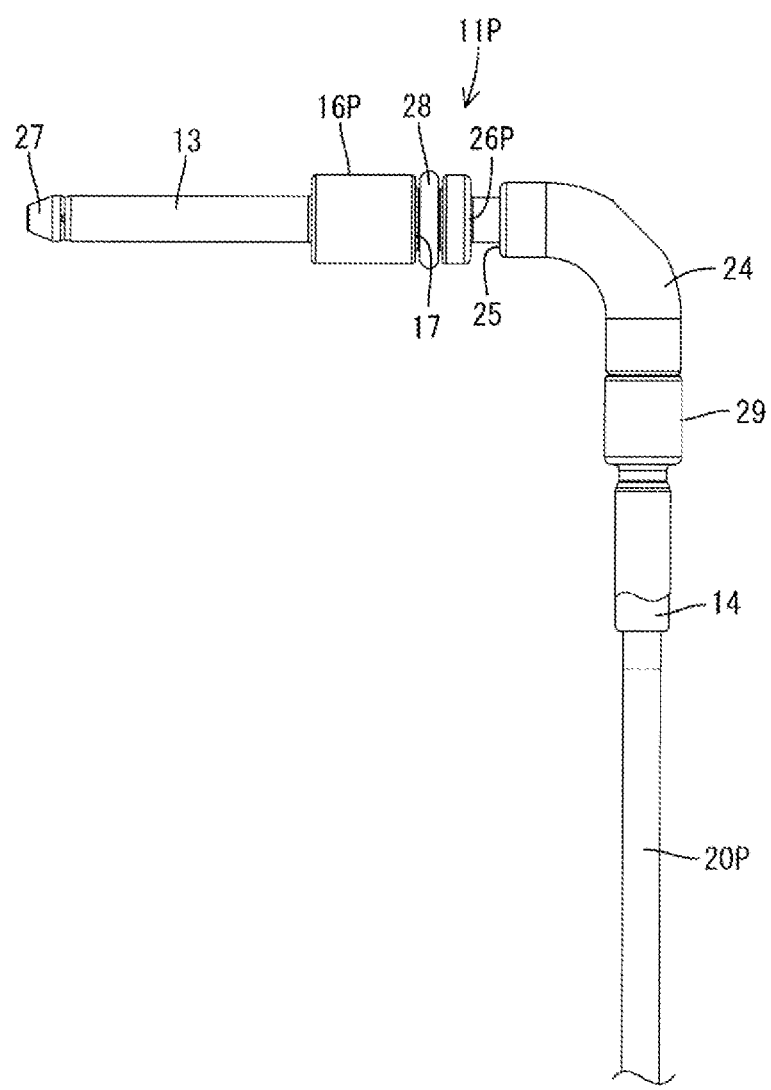
FIG. 7 is a side view of the vehicle-side power terminal.
Figure 8:
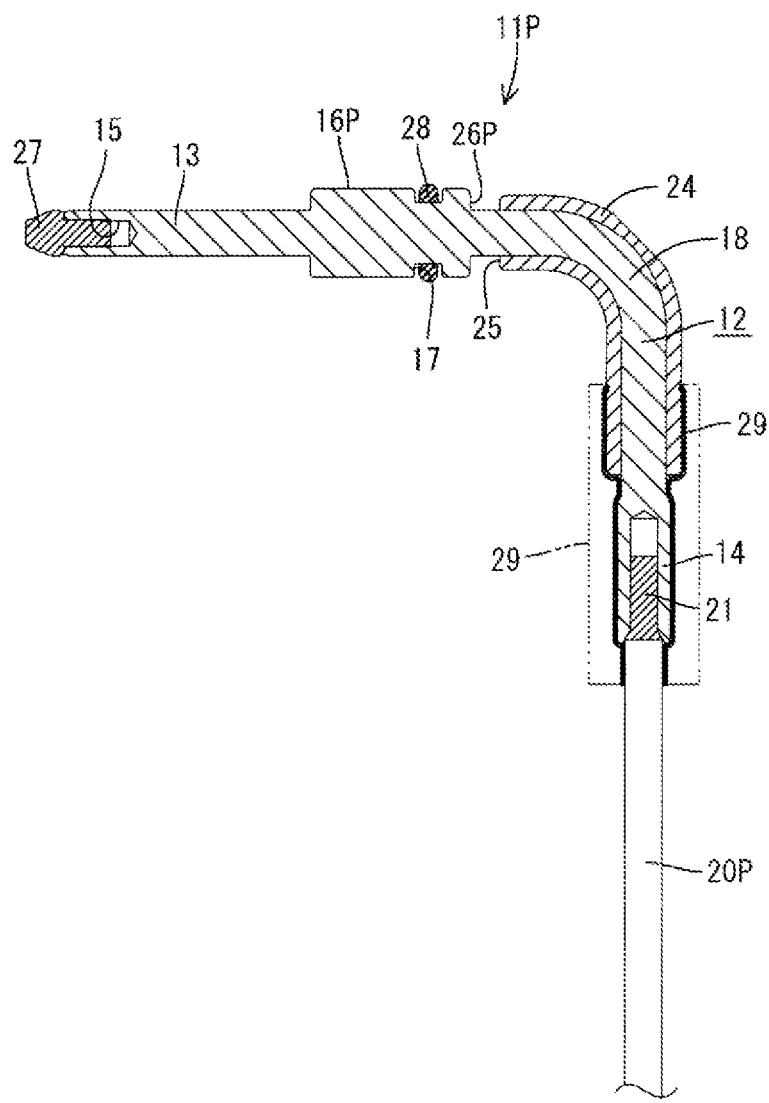
FIG. 8 is a vertical section of the vehicle-side power terminal.
Figure 9:
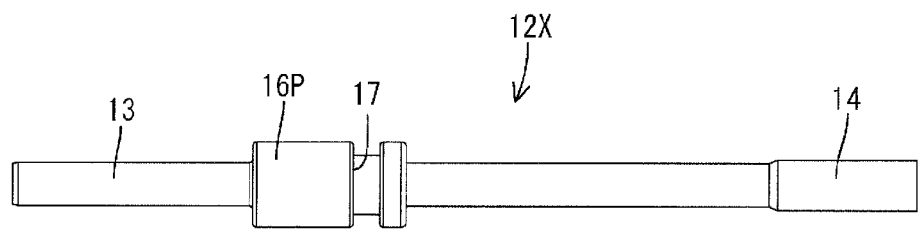
FIG. 9 is a side view of a primarily molded terminal of the power terminal.

The power terminal 11P is described as a representative. This power terminal 11P is, as shown in FIGS. 6 to 8, formed such that a terminal connecting portion 13 to be connected to a mating power terminal is formed to extend straight on one end side and a tubular wire connecting portion 14 to be crimped to a core 21 of a wire 20P is formed on the other end side. A mounting hole 15 into which a protection cap 27 is fitted is open on the tip surface of the terminal connecting portion 13. A stopper portion 16P (16) enlarged in diameter is formed over a predetermined length on a base end side of the terminal connecting portion 13 and a fitting groove 17 for a seal ring 28 is circumferentially provided on the outer peripheral surface of this stopper portion 16P.

Figure 10:
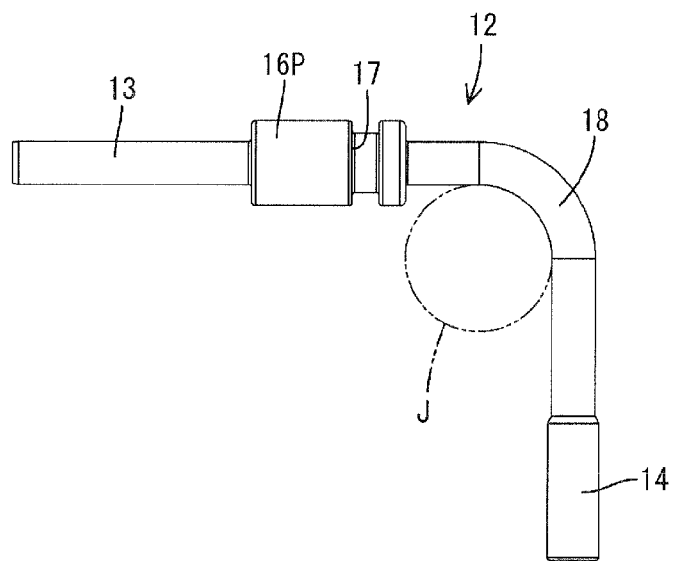
FIG. 10 is a side view in a state where the primarily molded terminal is bent.
Figure 11:
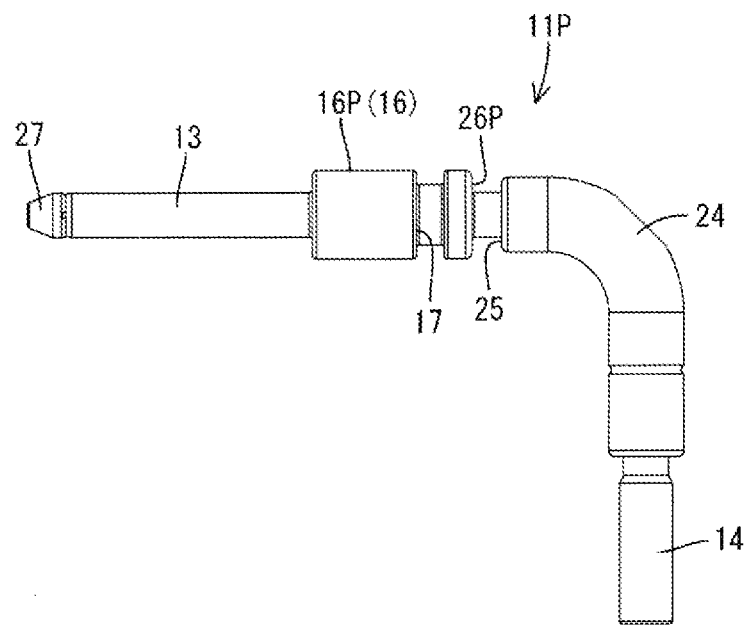
FIG. 11 is a side view of the power terminal.

The power terminal 11P is formed as the L-shaped round pin terminal 12 by bringing a jig J into contact with a straight primarily molded terminal 12X (FIG. 9) formed by heading a metal round bar as a base material at a predetermined position in a length direction a plurality of number of times as shown in FIG. 10. Thereafter, an insulating tube portion 24 made of synthetic resin is formed on a bent portion 18 of the round pin terminal 12 by molding. One end surface 25 of this insulating tube portion 24 is formed at a position at a predetermined distance from the rear surface of the stopper portion 16P, and a locked groove 26P (26) into which a locking portion 56 of the retainer 50 to be described later is formed between these facing surfaces. Note that the other end surface of the insulating tube portion 24 is located at a position slightly before (above) the wire connecting portion 14.

The power terminal 11P is connected to an end of a large-diameter wire 20P (thick wire 20P). To do so, an end of a core 21 exposed by removing a coating of the end of the thick wire 20P is inserted into and connected to the wire connecting portion 14. Thereafter, the wire connecting portion 14 is made waterproof by mounting a heat shrinking tube 29 from the lower end of the insulating tube portion 24 to the lower end of the wire connecting portion 14 on the thick wire 20P. Note that the heat shrinking tube 29 before being thermally shrunk is shown in chain line in FIG. 8.

Finally, the seal ring 28 is fitted into the fitting groove 17 of the stopper portion 16P and the protection cap 27 is mounted into the mounting hole 15 on the tip surface of the terminal connecting portion 13. In this way, the L-shaped power terminal 11P is connected to the end of the thick wire 20P.

The ground terminal 11G and the signal terminal 11S are described. Note that parts and members of the both terminals 11G, 11S having the same function as the power terminal 11P described above are denoted by the same reference signs and distinguished by attaching a suffix if they particularly need to be distinguished.

Figure 12:
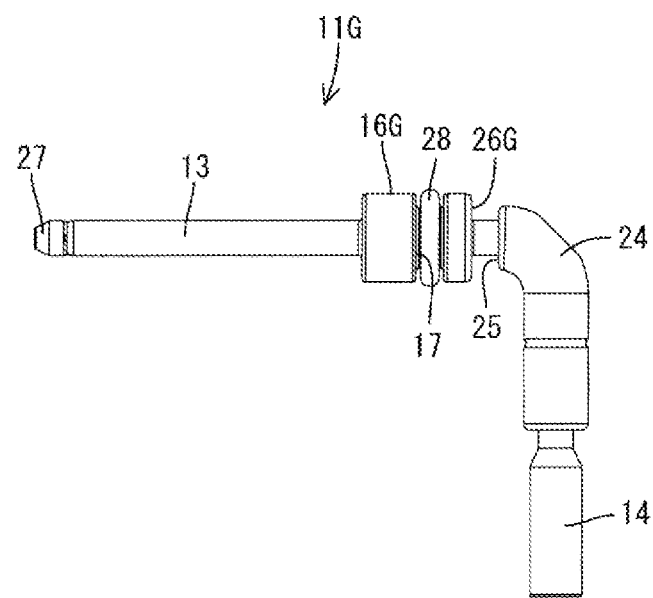
FIG. 12 is a side view of a vehicle-side ground terminal.

As shown in FIG. 12, the ground terminal 11G is shaped similarly to the power terminal 11P except that the front surface of a stopper portion 16G is located more backward than that of the power terminal 11P, and the L-shaped ground terminal 11G is connected to an end of a thick wire 20P by crimping the wire connecting portion 14 to an exposed end of a core 21 of the thick wire 20P.

Note that three thick wires 20P are bundled into one as an integrated shielded wire Wa (cab tire cable).

Figure 13:
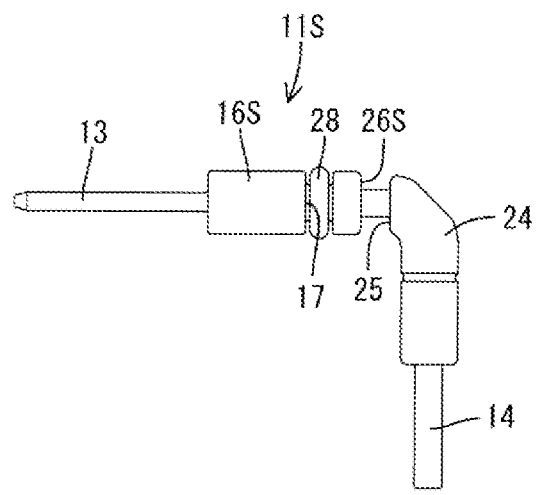
FIG. 13 is a side view of a vehicle-side signal terminal.

As shown in FIG. 13, the signal terminal 11S differs from the power terminal 11P in that it is thinner in diameter as a whole, the terminal connecting portion 13 is short and the protection cap 27 is not mounted. An end of a small-diameter wire 20S (thin wire 20S; see FIG. 5) is connected to this signal terminal 11S by crimping the wire connecting portion 14 thereto.

Figure 3:
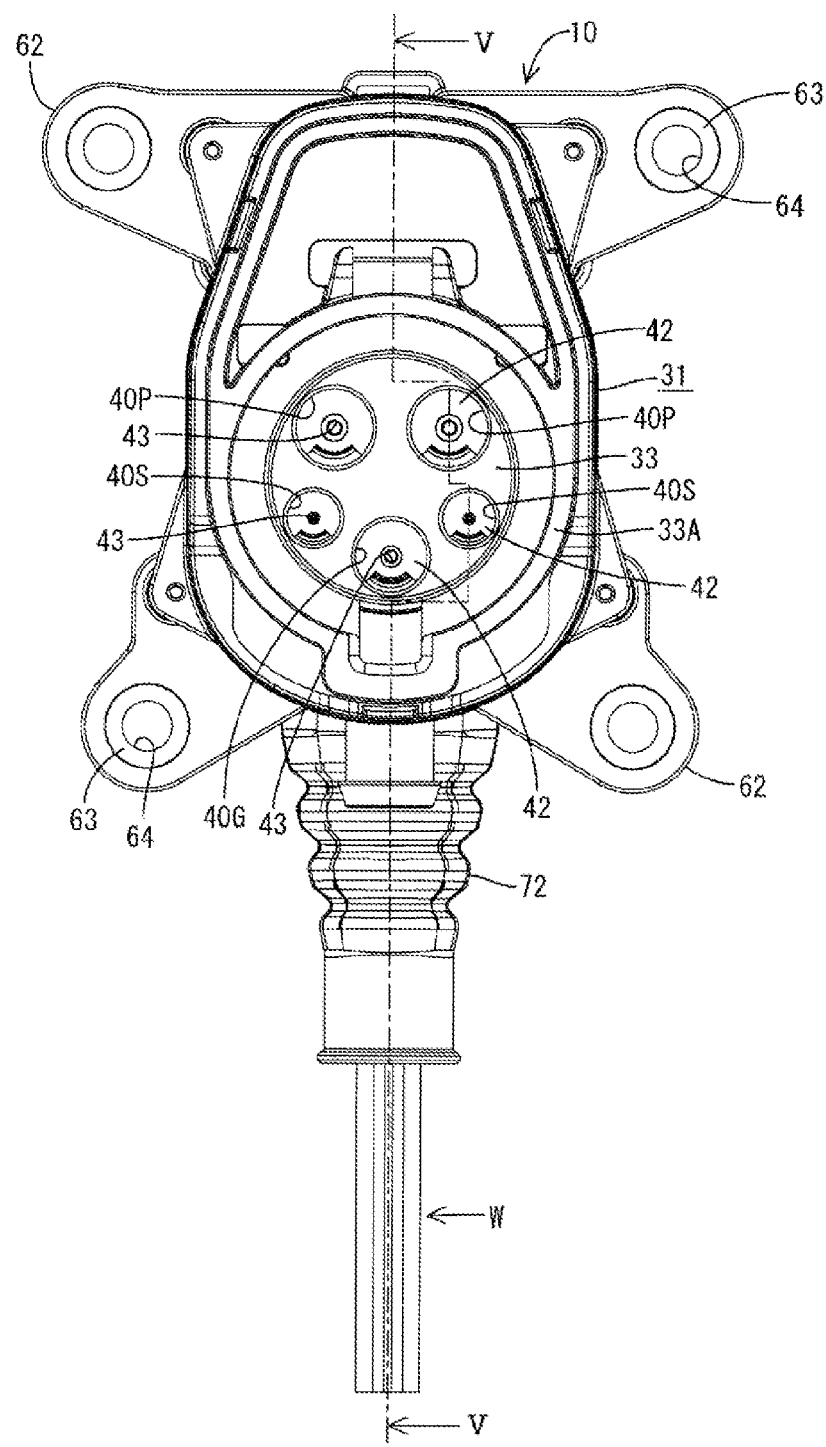
FIG. 3 is a front view in a state where a front cover of the vehicle-side connector is removed.
Figure 5:
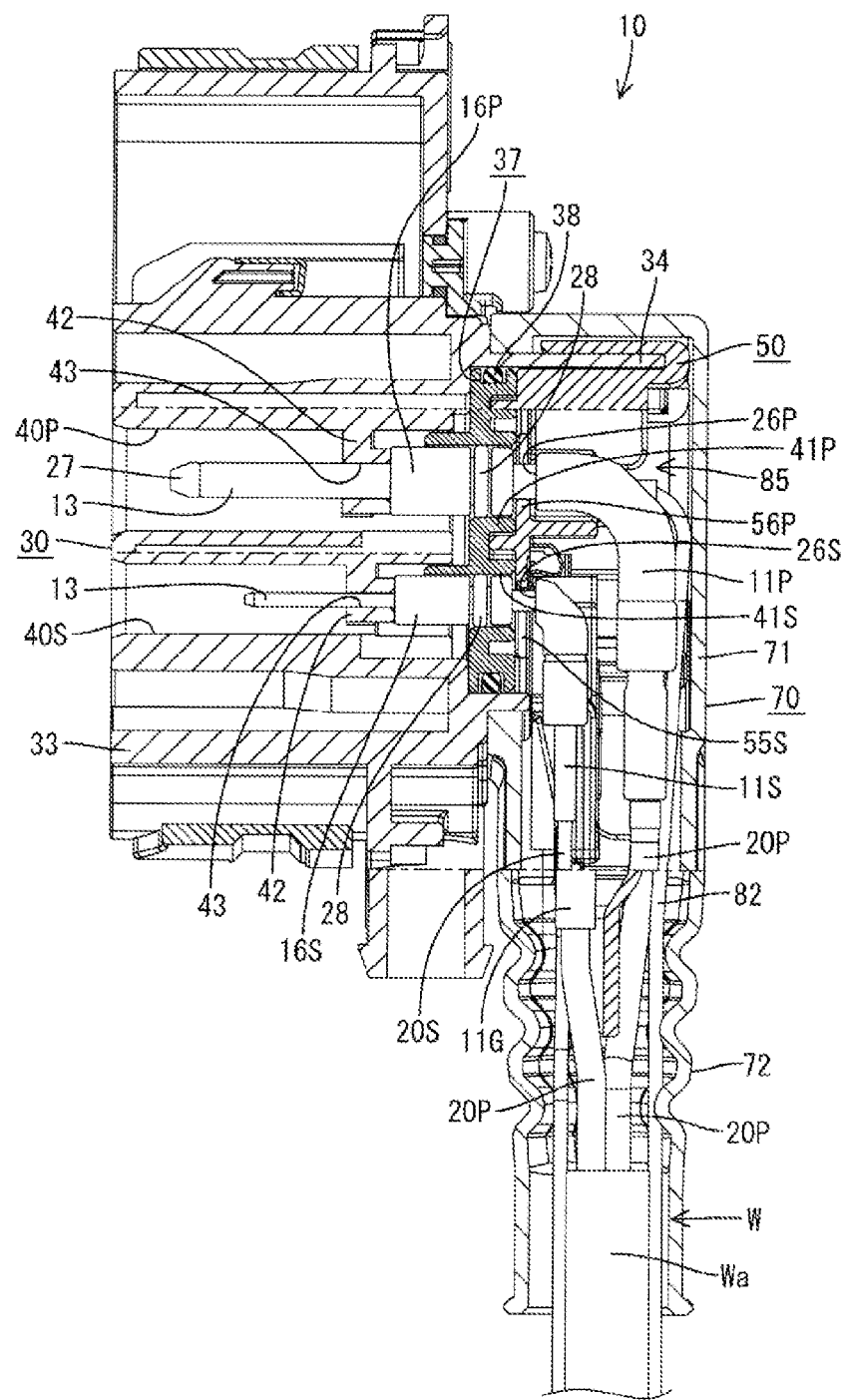
FIG. 5 is a section along V-V of FIG. 3.

The male housing 30 is made of synthetic resin and composed of two pieces, i.e. a housing main body 31 and a sub-housing 37 as shown in FIG. 5. As shown in FIG. 3, the housing main body 31 is such that a cylindrical terminal accommodating portion 33 is formed to project on the front surface of a substantially rectangular base plate 32 (see FIG. 14) and a large receptacle 33A into which the small receptacle 4 of the female housing 3 in the above charging connector 1 is to be fitted is formed around the terminal accommodating portion 33.

Figure 14:
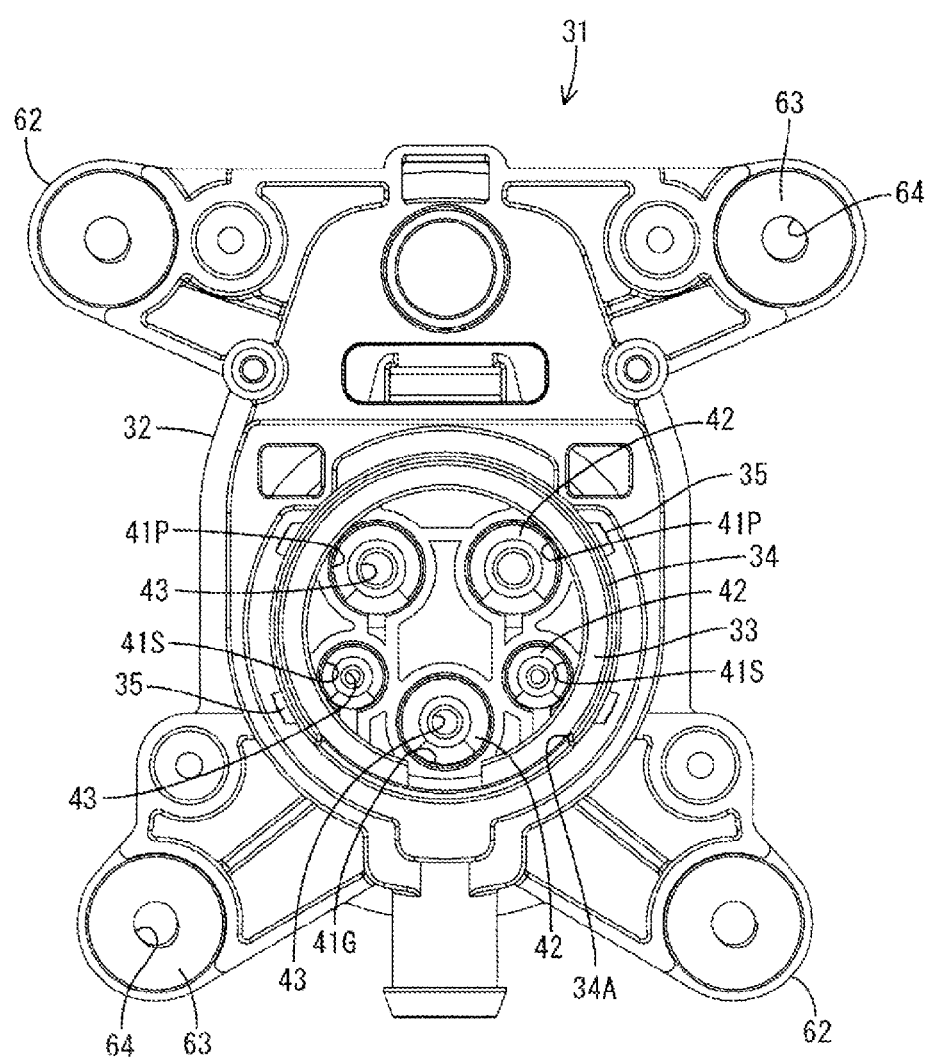
FIG. 14 is a rear view of a housing main body.

As shown in FIG. 14, a fitting tube portion 34 is formed around the rear surface of the terminal accommodating portion 33 on a rear surface side of the base plate 32, and a rear end surface of the lower surface of this fitting tube portion 34 is cut to form an escaping recess 34A. As shown in FIG. 5, the disc-like sub-housing 37 is fitted in a watertight manner in the fitting tube portion 34 via a seal ring 38 fitted on a peripheral surface.

Five terminal accommodating chambers 40 open forward and backward are formed from the terminal accommodating portion 33 of the housing main body 31 to the sub-housing 37 arranged on the rear surface side of the terminal accommodating portion 33 in such an arrangement that the terminal accommodating tubes 5 of the mating charging connector 1 are respectively fittable from front. Thus, as shown in FIG. 3, the male power terminals 11P are accommodated into two terminal accommodating chambers 40P in an upper row, the male ground terminal 11G is accommodated into the terminal accommodating chamber 40G in the center of a lower row and the female signal terminals 11S are accommodated into the terminal accommodating chambers 40S on opposite sides of the lower row by being respectively inserted from behind.

Each terminal accommodating chamber 40P, 40G, 40S has a diameter substantially fittable to the stopper portion 16 of the corresponding vehicle-side terminal 11 (power terminal 11P, ground terminal 11G, signal terminal 11S). Further, a stopper wall 42 with which the front surface of the stopper portion 16 of the corresponding vehicle-side terminal 11 is to be brought into contact is formed at a longitudinal intermediate position of the terminal accommodating chamber 40, and an insertion hole 43 through which the terminal connecting portion 13 of the corresponding vehicle-side terminal 11 is to be inserted is open on each stopper wall 42.

Accordingly, the terminal connecting portion 13 of each vehicle-side terminal 11 (11P, 11G, 11S) is inserted into the corresponding terminal accommodating chamber 40 (40P, 40G, 40S) from behind and pushed while passing through the insertion hole 43 halfway through and the pushing is stopped when the front surface of the stopper portion 16 comes into contact with the stopper wall 42. At this time, the terminal connecting portion 13 of each vehicle-side terminal 11 projects forwardly of the stopper wall 42 and the seal ring 28 fitted on the stopper portion 16 is tightly fitted into an entrance 41P, 41G, 41S of each terminal accommodating chamber 40P, 40G, 40S. Further, as shown in FIG. 5, the locked groove 26 of each vehicle-side terminal 11 is arranged at a position behind the rear surface of the sub-housing 37.

Figure 15:
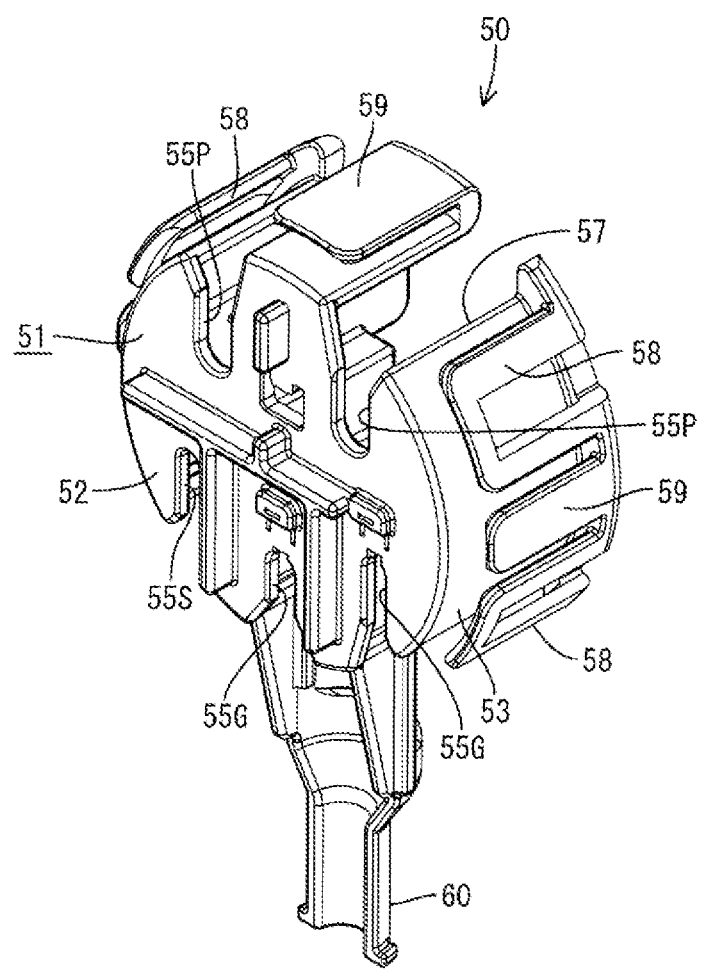
FIG. 15 is a perspective view of a retainer.
Figure 16:
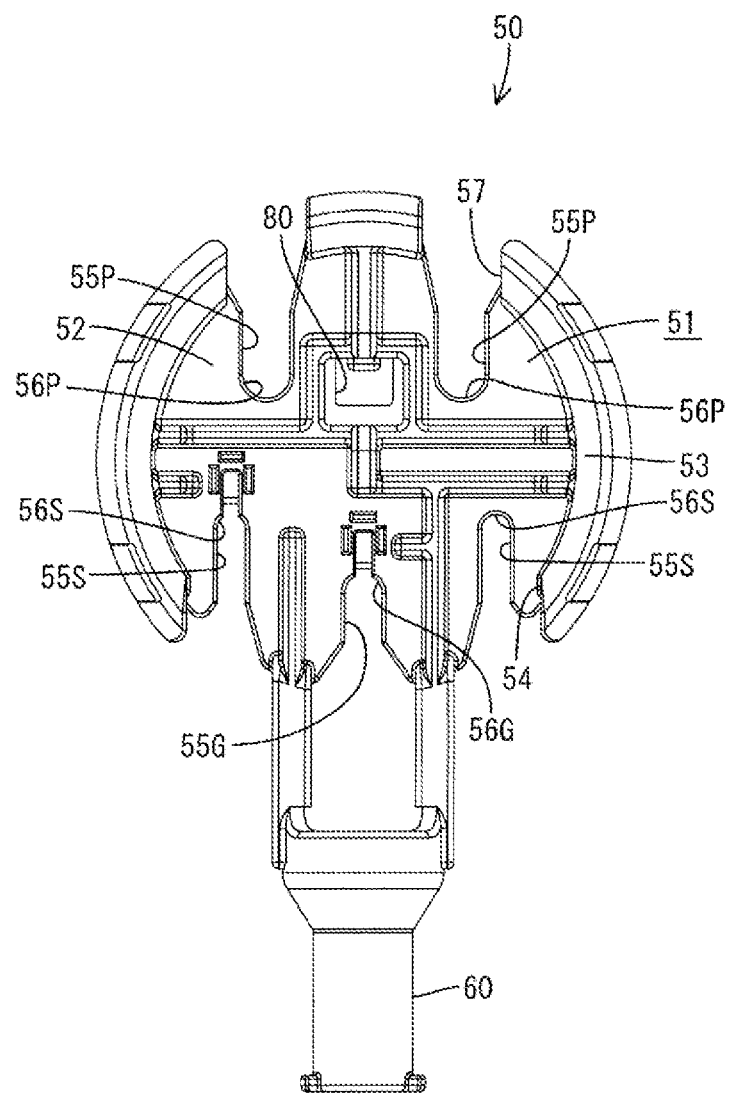
FIG. 16 is a rear view of the retainer.
Figure 17:
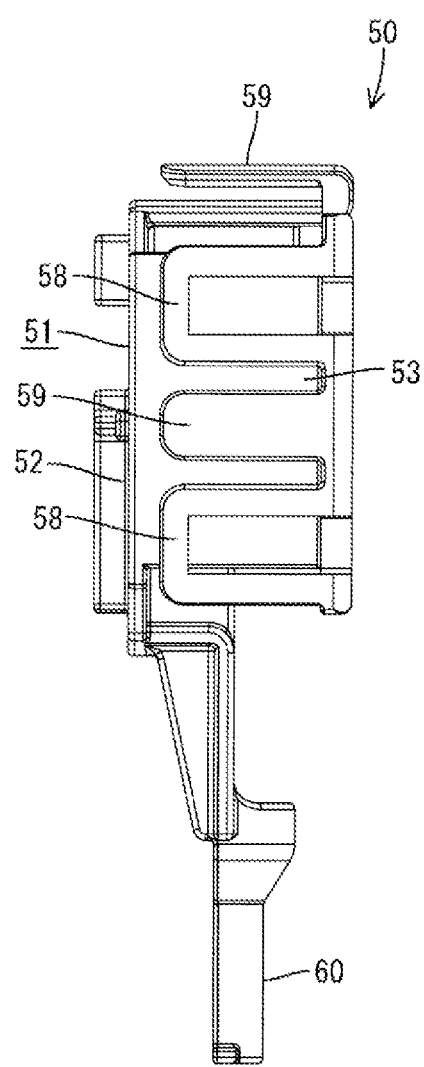
FIG. 17 is a side view of the retainer.

The retainer 50 is provided to hold a state where the vehicle-side terminal 11 is retained and accommodated in each terminal accommodating chamber 40. This retainer 50 is made of synthetic resin. As shown in FIGS. 15 to 17, the retainer 50 includes a substantially hollow cylindrical retainer main body 51 with a front surface plate 52 and this retainer main body 51 is fittable to the rear surface side of the sub-housing 37 in the fitting tube portion 34 provided in the housing main body 31. The lower surface of a peripheral wall 53 of the retainer main body 51 is cut in a range of substantially one-quarter circumference to form an escaping recess 54.

Five vertical locking grooves 55 into which the locked grooves 26 formed on the respective vehicle-side terminals 11 are radially insertable are so formed on the front surface plate 52 of the retainer main body 51 as to be open on the peripheral edge of the front surface plate 52. The back ends of the respective locking grooves 55 are respectively concentrically arranged with the five terminal accommodating chambers 40.

The locked grooves 26P of the power terminals 11P are tightly insertable into two locking grooves 55 open on the upper edge out of the five locking grooves 55. Note that escaping grooves 57 extending backward from the upper edges of the respective locking grooves 55P are formed on the upper surface of the peripheral wall 53 of the retainer main body 51. The locked groove 26P of the power terminal 11P is tightly fitted into a lower end part of each locking groove 55P. Thus, the peripheral edge (lower edge and opposite side edges) of the lower end part of the locking groove 55P serves as a locking portion 56P to be locked to side surfaces of the locked groove 26P.

The locked groove 26G of the ground terminal 11G is tightly insertable into the central locking groove 55G out of three locking grooves 55 open on the lower edge. The locked groove 26G of the ground terminal 11G is tightly fitted into an upper end part of this locking groove 55G. Thus, the peripheral edge (upper edge and opposite side edges) of the upper end part of the locking groove 55G serves as a locking portion 56G to be locked to groove surfaces of the locked groove 26P.

The locked grooves 26S of the signal terminals 11S are tightly insertable into two locking grooves 55G on opposite ends. The locked groove 26S of the signal terminal 11G is tightly fitted into an upper end part of each locking groove 55S. Thus, the peripheral edge (upper edge and opposite side edges) of the upper end part of the locking groove 55S serves as a locking portion 56S to be locked to groove surfaces of the locked groove 26S.

Two pairs of left and right lock frames 58 which can slide in contact with the outer peripheral surface of the above fitting tube portion 34 are resiliently displaceably provided on an outer peripheral part of the peripheral wall 53 of the retainer main body 51 while being folded forward from the rear edge of the peripheral wall 53. Note that clamping plates 59 capable of clamping the fitting tube portion 34 in cooperation with the peripheral wall 53 are formed between the lock frames 58 likewise while being folded forward from the rear edge of the peripheral wall 53.

On the other hand, as shown in FIG. 14, lock protrusions 35 are formed at four positions corresponding to the respective lock frames 58 on the outer peripheral surface of the fitting tube portion 34.

The retainer 50 is pushed from behind while the fitting tube portion 34 is inserted between the peripheral wall 53 of the retainer main body 51 and the lock frames 58 and the clamping plate 59, and the lock frames 58 move onto the corresponding lock protrusions 35 halfway through to be deflected, displaced and pushed. When the retainer 50 is pushed to a proper position where the tip of the fitting tube portion 34 reach the back ends of the lock frames 58 and the clamping plates 59 as shown in FIG. 5, the lock frames 58 are restored and displaced to be fitted to the lock protrusions 35, whereby the retainer 50 is mounted while being prevented from coming off backward.

Note that a substantially semi-cylindrical wire holding portion 60 is formed to hang down from the position of the escaping recess 54 on the lower edge of the front surface plate 52 of the retainer main body 51.

Mounting portions 62 are formed to project outward on four corners of the base plate 32 in the housing main body 31, and each mounting portion 62 is provided with a collar 63 made of metal and formed with a bolt hole 64 by insert molding.

The grommet 70 is made of rubber and structured such that a bellows-like wire inserting portion 72, into which a group of the wires 20P is inserted, is connected to the lower end of a cover portion 71 for covering around the retainer 50 from behind.

Note that a front cover 75 is removably mounted on the front surface of the male housing 30.

Next, an example of the procedure of assembling the vehicle-side connector 10 and mounting it on the body is described.

As already described, the wire connecting portion 14 of each vehicle-side terminal 11 is crimped and connected to the end of each wire 20P, 20S and, associated with that, the heat shrinking tube 29 is mounted to make a crimped part waterproof. The five vehicle-side terminals 11 connected to the ends of the wires 20P, 20S in this way are mounted into the retainer 50. The locked groove 26 of each vehicle-side terminal 11 is radially inserted into the corresponding locking groove 55 and fitted to the back end of each locking groove 55. In this way, the opposite side surfaces of the locked groove 26 of each vehicle-side terminal 11 are locked to the locking portion 56, whereby each vehicle-side terminal 11 is mounted with movements thereof in the front-back direction (lateral direction of FIG. 5) regulated.

The wire connecting portion 14 of each vehicle-side terminal 11 projects downward through the escaping recess 54 formed on the lower surface of the peripheral wall 53 of the retainer main body 51 and the wire 20P, 20S connected to each wire connecting portion 14 is arranged along the front and rear surfaces of the wire holding portion 60.

Figure 4:
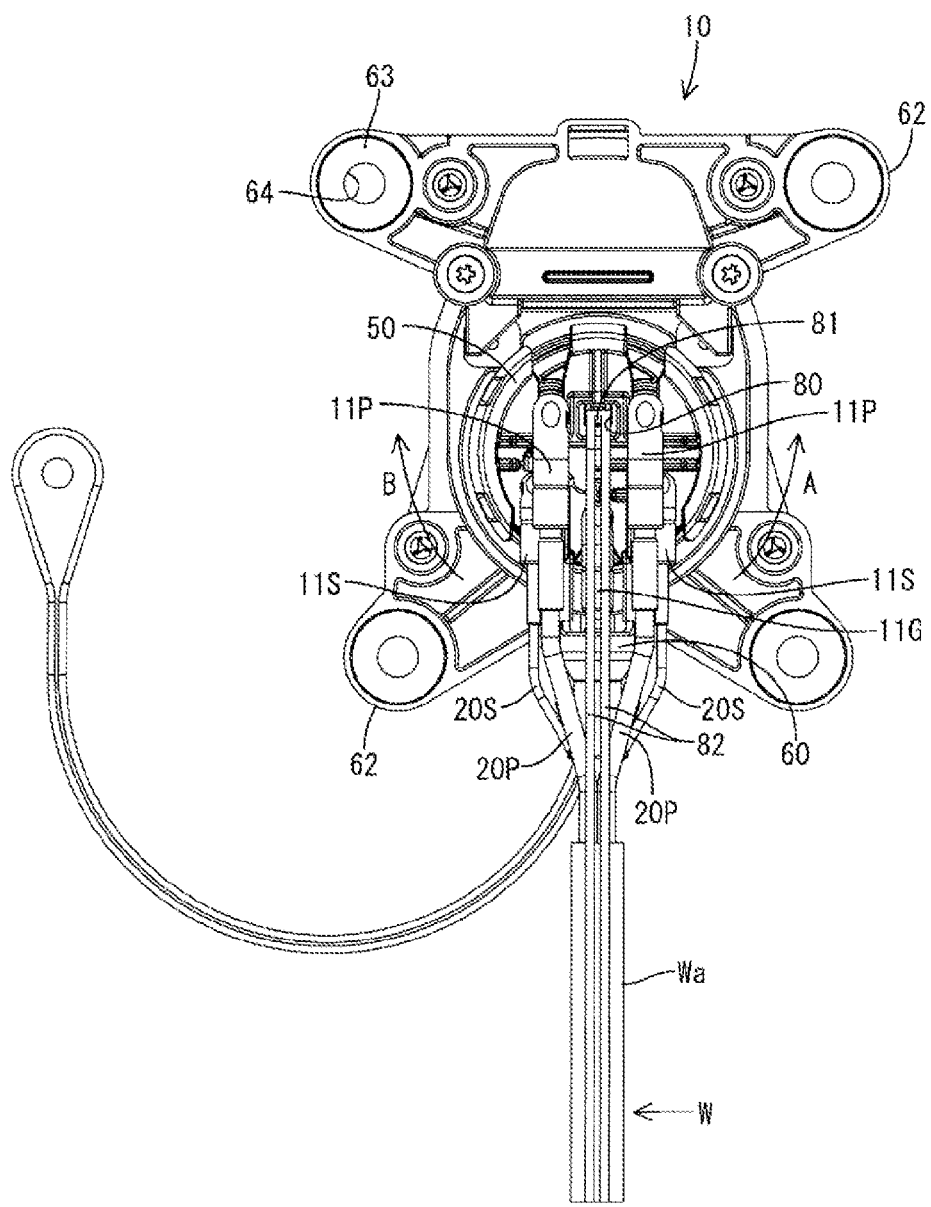
FIG. 4 is a rear view in a state where a grommet of the vehicle-side connector is removed.

Note that, as shown in FIG. 4, a temperature sensor 81 is retained and accommodated in a sensor accommodating chamber 80 provided on the rear surface of the front plate 52 of the retainer 50, and lead wires 82 drawn out from the temperature sensor 81 are also similarly arranged along the wire holding portion 60. These wires 20P, 20S and 82 arranged along the wire holding portion 60 are satisfactorily bundled if being taped and fixed.

Subsequently, the terminal connecting portion 13 of each vehicle-side terminal 11 projecting on the front surface of the retainer 50 is inserted into the entrance 41 of the terminal accommodating chamber 40 formed in the sub-housing 37 from behind. When the retainer 50 is inserted until the front surface plate 52 of the retainer main body 51 comes into contact with the rear surface of the sub-housing 37, the seal ring 28 fitted on the stopper portion 16 of each vehicle-side terminal 11 is tightly fitted into the entrance 41 of the corresponding terminal accommodating chamber 40 and the sub-housing 37 and the retainer 50 are integrally assembled on the ends of the wires 20P, 20S (vehicle-side terminals 11) (sub-assembly 85) by frictional forces acting between the seal rings 28 and the entrances 41.

Subsequently, this sub-assembly 85 is fitted into the fitting tube portion 34 from behind while the terminal connecting portion 13 of each vehicle-side terminal 11 (11P, 11G, 11S) is inserted into the corresponding terminal accommodating chamber 40 (40P, 40G, 40S) formed in the terminal accommodating portion 33 of the housing main body 31 as shown in FIG. 5. The sub-assembly 85 is pushed while the terminal connecting portion 13 of each vehicle-side terminal 11 is inserted into the insertion hole 43 of the stopper wall 43 in the corresponding terminal accommodating chamber 40 and the lock frames 58 on the outer periphery of the retainer 50 are resiliently displaced to move onto the lock protrusions 35. When the sub-assembly 85 is fitted to a proper position where the front surface of the stopper portion 16 of each vehicle-side terminal 11 comes into contact with the stopper wall 42, the lock frames 58 are restored and displaced to be fitted to the lock protrusions 35, whereby the sub-assembly 85 is locked in a state fitted in the fitting tube portion 34. In this way, the sub-assembly 85 is integrally assembled with the housing main body 31 to form the male housing 30.

Associated with this, the terminal connecting portion 13 of the L-shaped vehicle-side terminal 11 connected to the end of each wire 20P, 20S is inserted to a proper position into the corresponding terminal accommodating chamber 40 and accommodated while being prevented from coming off backward by the retainer 50.

Along with that, in a state where each vehicle-side terminal 11 is bent at a right angle in the retainer main body 51, the wire connecting portion 14 hangs down and projects downward through the escaping recess 54. The wire 20P, 20S drawn out from each wire connecting portion 14 is arranged along the wire holding portion 60 provided on the retainer 50 and taped and held together with the lead wires 82 drawn out from the temperature sensor 81.

Subsequently, the grommet 70 is mounted on the rear surface side of the male housing 30. Specifically, the cover portion 71 covers around the retainer 50 from behind and the wires 20P, 20S and 82 are inserted into the bellows-like wire inserting portion 72 and drawn out downwardly. A wire group W of those wires is connected to a battery and the like mounted in the vehicle.

After the male housing 30 is formed on the wire group W and the grommet 70 is mounted on the rear surface side of the male housing 30 in this way, the male housing 30 is arranged inside the power supply port open on the body of the vehicle and the mounting portions 62 provided on the base plate 32 of the male housing 30 are brought into contact with mounted portions (not shown) provided on an opening edge part of the power supply port and fixed by being bolted. Finally, the front cover 75 is mounted on the front surface of the male housing 30, whereby the mounting of the vehicle-side connector 10 is completed.

In the case of performing a charging operation, after a lid body provided on the power supply port is opened, the front cover 75 of the male housing 30 is removed and the female housing 3 of the charging connector 1 shown in FIG. 1 is fitted into the terminal accommodating portion 33 of the male housing 30, whereby the battery mounted in the vehicle is charged from a commercial power source.

In the vehicle-side connector 10 of this embodiment, the following numerous effects can be obtained. Since the vehicle-side terminals 11 are L-shaped, the wires 20P, 20S themselves can be drawn out in a direction perpendicular to the terminal accommodating chambers 40 and routed without being bent. As a result, space saving on the rear surface of the male housing can be realized.

Since each vehicle-side terminal 11 is the round pin terminal 12 and the terminal connecting portion 13 thereof can be rotated about an axis in the corresponding terminal accommodating chamber 40, the terminal connecting portion 13 of each vehicle-side terminal 11 can be drawn out in an arbitrary direction such as a 3 o'clock direction (direction of an arrow A) or a 9 o'clock direction (direction of an arrow B) on a clock plate as shown in FIG. 4 and, hence, the wire group W can be drawn out in an arbitrary direction. This can be dealt with by a simple change such as a change in the positions of the fitting tube portion 34 of the housing main body 31 and the escaping recesses 34A, 54 provided on the peripheral wall 53 of the retainer 50. In short, diversification in the draw-out direction in the case of drawing out the wire group W in a radial direction on the rear surface of the male housing 30 can be relatively easily dealt with.

That each vehicle-side terminal 11 is the round pin terminal 12 is convenient in bundling the wires 20P, 20S drawn out from the wire connecting portions 14 of the vehicle-side terminals 11 while appropriately rotating the vehicle-side terminals 11 about their axes in the terminal accommodating chambers 40.

Since the vehicle-side terminal 11 of this embodiment is structured such that the cylindrical stopper portion 16 is provided on the base end side of the terminal connecting portion 13 and the seal ring 28 to be held in close contact with the inner peripheral surface of the entrance 41 of the terminal accommodating chamber 40 is fitted on the outer periphery of this stopper portion 16, the terminal accommodating chambers 40 can be reliably made waterproof from outside while the vehicle-side terminals 11 are allowed to rotate about the axes of the terminal connecting portions 13 in bundling the wires 20P, 20S as described above.

Since the insulating tube portion 24 made of synthetic resin is provided on the outer periphery of the bent portion 18 of each vehicle-side terminal 11, the insulating tube portion 24 comes into contact with the adjacent vehicle-side terminal 11 to reliably maintain an insulated state between adjacent vehicle-side terminals 11 even if the vehicle-side terminal 11 rotates about the axis of the terminal connecting portion 13 and comes close to the adjacent vehicle-side terminal 11, for example, in bundling the wires 20P, 20S as described above.

Further, in this embodiment, the locked groove 26 is provided on the base end part of the terminal connecting portion 13 in the vehicle-side terminal 11 and radially inserted into and retained in the locking groove 55 formed on the retainer 50 as a means for retaining and accommodating the vehicle-side terminal 11 in the terminal accommodating chamber 40. Particularly, the rear end surface of the stopper portion 16 and the front end surface of the insulating tube portion 24 serve as the opposite side surfaces of the locked groove 26.

Here, not only the rear end surface of the stopper portion 16, but also the insulating tube portion 24 is formed by molding as described above. Thus, the front end surface of the insulating tube portion 24 can also be formed into a flat surface. Therefore, the locked groove 26 of the vehicle-side terminal 11 can be precisely and smoothly inserted into the locking groove 55 of the retainer 50 and, consequently, precise mounting of the retainer 50 is ensured.

Note that, in order to lock the rear side surface of the locked groove 26 to the flat surface, it suffices, for example, to form a flange projecting from the outer peripheral surface of the round pin terminal 12 at a position behind and at a predetermined distance from the rear end surface of the stopper portion 16. If the flange stands, there is a situation that the flange stands as an obstacle and the primarily molded terminal 12X cannot be bent at a right angle when it is tried to perform right-angle bending using the jig J as shown in FIG. 10.

Thus, it is effective in forming the locked groove 26 on the L-shaped round pin terminal 12 to use the front end surface of the insulating tube portion 24 molded after bending as the rear side surface of the locked groove 26.

The present invention is not limited to the above described and illustrated embodiment. For example, the following embodiments are also included in the technical scope of the present invention.

Although the vehicle-side terminal is L-shaped by bending the round pin terminal at a right angle at the position between the terminal connecting portion and the wire connecting portion in the above embodiment, it may be substantially L-shaped by being bent at an obtuse angle at a position between the two connecting portions. Such an embodiment is also included in the technical scope of the present invention.

Although the insulating tube portion is provided on the bent portion of each vehicle-side terminal by molding in the above embodiment, another means such as the mounting of a separately formed insulating tube portion may be adopted as long as the insulating tube portion is provided for the purpose of preventing the contact of adjacent vehicle-side terminals.

The insulating tube portions may not be provided if there is no possibility of contact of adjacent vehicle-side terminals according to conditions such as an arrangement interval of the vehicle-side terminals.

In providing the locked groove on the vehicle-side terminal for the retainer, the locked groove may be directly formed on the outer peripheral surface of the round pin terminal as long as it does not obstruct the bending of the round pin terminal.

The procedure of assembling the vehicle-side connector and mounting the vehicle-side connector on the vehicle illustrated in the above embodiment is merely an example and another procedure may be adopted. For example, the housing main body of the male housing may be first fixed to the vehicle, whereas the sub-assembly connected to the end of the wire group may be fixed by being fitted into the fitting tube portion on the rear surface of the housing main body.

Further, another appropriate procedure may be adopted such as the mounting of only the sub-housing into the fitting tube portion of the housing main body in advance and then the mounting of the vehicle-side terminals and the retainer without integrally assembling the sub-housing and the retainer in advance (sub-assembly).

Although the male housing of the vehicle-side connector is composed of two pieces, i.e. the housing main body and the sub-housing in the above embodiment, the present invention is applicable also to a male housing composed of one piece.

The present invention is not limitedly applied to the vehicle-side connector provided in the plug-in hybrid vehicle illustrated in the above embodiment and can be similarly applied to vehicle-side connectors provided in electric vehicles.

LIST OF REFERENCE SIGNS

1 . . . charging connector
3 . . . female housing
10 . . . vehicle-side connector
11 . . . vehicle-side terminal (terminal fitting)
11P . . . power terminal
11G . . . ground terminal
11S . . . signal terminal
12 . . . round pin terminal
13 . . . terminal connecting portion
14 . . . wire connecting portion
18 . . . bent portion
20P, 20S . . . wire
24 . . . insulating tube portion
26, 26P, 26G, 26S . . . locked groove
28 . . . seal ring
30 . . . male housing (housing)
40, 40P, 40G, 40S . . . terminal accommodating chamber
41, 41P, 41G, 41S . . . entrance
50 . . . retainer
55, 55P, 55G, 55S . . . locking groove
56, 56P, 56G, 56S . . . locking portion
W . . . wire group

The invention claimed is:

1. A vehicle-side connector to be connected to a charging connector to charge a battery mounted in a vehicle, comprising:
  a housing provided on the vehicle such that the charging connector is fittable thereinto from front;
  terminal fittings respectively connected to a plurality of wires drawn out from the interior of the vehicle including the battery; and
  a plurality of terminal accommodating chambers provided in the housing and configured such that the respective terminal fittings are accommodated thereinto by being inserted from behind;
  wherein:
  the terminal fitting is a round pin terminal formed by being bent to include a terminal connecting portion to be connected to a charging terminal provided in the charging connector on one end side and a wire connecting portion to be crimped to an end of the wire on the other end side;
  an insulating tube portion made of synthetic resin is provided on the outer periphery of a bent portion of the terminal fitting; and
  a locked groove is formed on a base end part of the terminal connecting portion in the terminal fitting, and the terminal connecting portion of the terminal fitting is retained and accommodated in the terminal accommodating chamber by radially inserting a retainer into the locked groove of the terminal connecting portion; and one end surface of the insulating tube portion constitutes one groove surface of the locked groove.

2. A vehicle-side connector according to claim 1, wherein a seal ring to be held in close contact with an entrance of the terminal accommodating chamber is mounted on a base end side of the terminal connecting portion in the terminal fitting.

* * * * *